May 19, 1925.
I. J. WISOFF
1,538,536
GRIPPING IMPLEMENT
Filed May 17, 1924
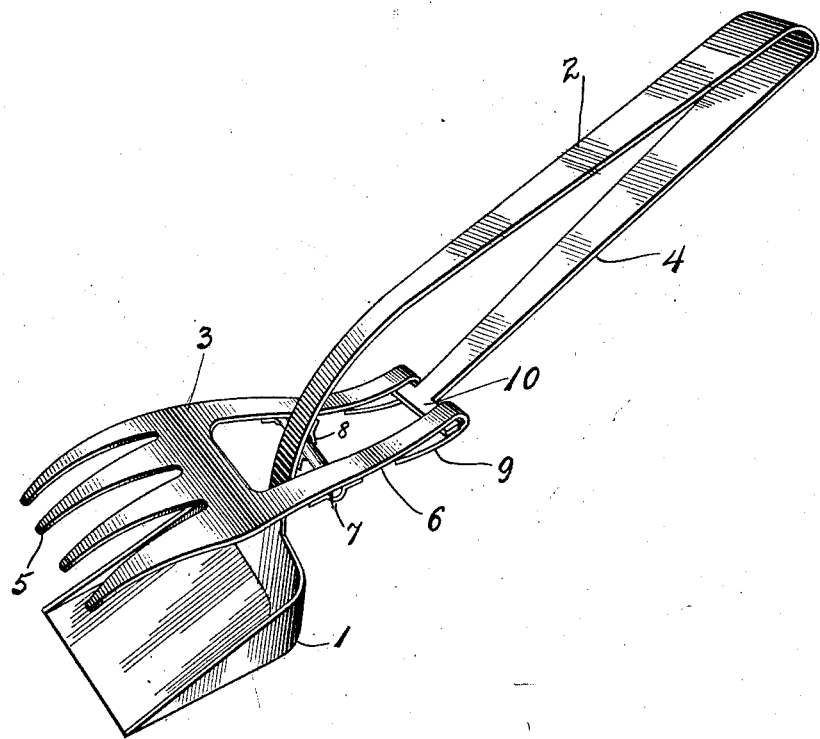
INVENTOR
Isaac J. Wisoff
BY
Wm. F. Nickel
HIS ATTORNEY Patented May 19, 1925.

1,538,536

UNITED STATES PATENT OFFICE.

ISAAC J. WISOFF, OF BROOKLYN, NEW YORK.

GRIPPING IMPLEMENT.

Application filed May 17, 1924. Serial No. 714,042.

*To all whom it may concern:*

Be it known that I, ISAAC J. WISOFF, a citizen of the United States, residing at Brooklyn, in the county of Kings and State of New York, have invented certain new and useful Improvements in Gripping Implements, of which the following is a specification.

My invention relates to improvements in gripping implements; particularly a gripping implement which can very conveniently be put to various uses in a home or dwelling.

An object of the invention is to provide a gripping implement of simple construction, capable of efficiently serving its intended purposes, and of such design that it can be cheaply produced.

Other objects and advantages will appear from the following description, taken with the drawing, but I of course reserve the right to make changes in the structure set forth that are within the broad meanings of the terms of the appended claim.

On the drawing—

The figure shows in perspective a gripping implement or device according to my invention.

The numeral 1 indicates a scoop having a handle 2. Cooperating with the scoop is a jaw 3, and the handle 2 has a spring extension that is bent from the rear end of the handle forward under the handle, towards the scoop 1. The jaw 3 has prongs or tines 5, in front, and rearward extensions 6 flanking the handle 2 where it is affixed to the scoop, and bridging these extensions is a pivot pin 7, which passes through a bearing 8 secured to the lower side of the adjacent portion of the handle 1. The extensions 6 terminate in loops 9, which receive the ends of a cross bar 10 at the end of the spring extension 4. Of course the pin 7 is fastened at both ends to the extensions 6.

To use the device one presses the extension 4 towards the handle 2, causing the bar 10 to force up the extensions 6, and move the jaw 3 towards the scoop. Thus the implement can be made to grip any article to be held by it. It is especially useful to remove any article of food, such as meat, fish etc., from a cooking vessel to a plate, or to lift victuals from a dish into a pan to be prepared for eating.

Having described my invention, what I believe to be new and desire to protect by Letters Patent is:—

An implement comprising a scoop, a handle joined thereto, a jaw with tines and having extensions flanking the handle, an extension on the handle projecting from the rear end of the handle toward the scoop, a pivot pin bridging the extensions of the jaw, a bearing on the handle for said pin, loops on the rear ends of the extensions of the jaw, and a cross bar on the front end of the extension of the handle engaged at its extremities by said loop.

In testimony whereof I affix my signature.

ISAAC J. WISOFF.